United States Patent
Tong et al.

(10) Patent No.: US 8,459,001 B2
(45) Date of Patent: Jun. 11, 2013

(54) AMMONIA INJECTION SYSTEM

(75) Inventors: Leslie Yung-Min Tong, Roswell, GA (US); Hua Zhang, Greer, SC (US); Diego Rancruel, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 959 days.

(21) Appl. No.: 12/537,977

(22) Filed: Aug. 7, 2009

(65) Prior Publication Data

US 2011/0030331 A1    Feb. 10, 2011

(51) Int. Cl.
*F02C 7/08* (2006.01)
*B01D 53/56* (2006.01)

(52) U.S. Cl.
USPC ......................................... 60/39.5; 423/239.1

(58) Field of Classification Search
USPC .............. 60/39.5, 39.182; 423/239.1; 422/28, 422/29, 33, 105, 123, 124, 168, 174, 177, 422/195, 198, 199, 211, 235
See application file for complete search history.

(56) References Cited

U.S. PATENT DOCUMENTS

| | | | | |
|---|---|---|---|---|
| 3,739,594 A * | 6/1973 | Freese | ................................ | 62/93 |
| 3,881,004 A * | 4/1975 | Kelly et al. | .................... | 423/235 |
| 4,131,432 A * | 12/1978 | Sato et al. | ...................... | 422/177 |
| 4,198,379 A * | 4/1980 | James | ......................... | 423/239.1 |
| 4,869,890 A * | 9/1989 | Adams et al. | ................. | 423/392 |
| 5,282,355 A * | 2/1994 | Yamaguchi | ..................... | 60/39.5 |
| 6,266,953 B1 * | 7/2001 | Ramstetter et al. | ............. | 60/783 |
| 2004/0079088 A1* | 4/2004 | Hayakawa et al. | ............. | 60/784 |
| 2009/0220401 A1* | 9/2009 | Nakagawa et al. | ......... | 423/239.1 |
| 2010/0205927 A1* | 8/2010 | Eiteneer et al. | ................. | 60/39.5 |

* cited by examiner

*Primary Examiner* — Gerald Sung
(74) *Attorney, Agent, or Firm* — Fletcher Yoder P.C.

(57) ABSTRACT

In one embodiment, a system includes an emissions reduction system including a compressor in fluid communication with a catalyst mixing tank. The compressor is configured to output an air flow configured to deliver catalyst from the catalyst mixing tank to a catalyst injection grid. A temperature of the air flow is increased by the compressor.

20 Claims, 2 Drawing Sheets

AMMONIA INJECTION SYSTEM

BACKGROUND OF THE INVENTION

The subject matter disclosed herein relates to an ammonia injection system.

Combustion of a fuel, such as a hydrocarbon fuel, produces a variety of exhaust products. For example, a compression ignition engine (e.g., diesel engine), a spark ignition internal combustion engine, and a gas turbine engine typically emit carbon dioxide ($CO_2$), oxides of sulfur (SOx), oxides of nitrogen (NOx), particulates and/or carbon monoxide (CO). Furthermore, the quantity and/or concentration of certain exhaust products may be limited by regulation. Therefore, certain systems include an exhaust processing facility configured to reduce emissions of exhaust products to regulatory levels. Unfortunately, these systems consume considerable space for the various components configured to reduce the emissions. Moreover, each component typically consumes energy. Thus, the space and energy consumption of the various components increases costs and complexity in the facility.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an ammonia injection system including an ammonia injection grid configured to inject ammonia into exhaust gas from a combustion process. The ammonia injection system also includes an ammonia mixing tank in fluid communication with the ammonia injection grid. The ammonia injection system further includes a compressor in fluid communication with the ammonia mixing tank. The compressor is configured to output an air flow having a temperature to vaporize the ammonia within the ammonia mixing tank and a pressure to inject the vaporized ammonia into the exhaust gas via the ammonia injection grid.

In a second embodiment, a system includes an ammonia injection grid (AIG) air compressor configured to provide an air flow to an ammonia mixing tank. A temperature of the air flow is configured to vaporize ammonia within the ammonia mixing tank, and a pressure of the air flow is configured to inject the vaporized ammonia into exhaust gas of a combustion reaction.

In a third embodiment, a system includes an emissions reduction system including a compressor in fluid communication with a catalyst mixing tank. The compressor is configured to output an air flow configured to deliver catalyst from the catalyst mixing tank to a catalyst injection grid. A temperature of the air flow is increased only by the compressor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
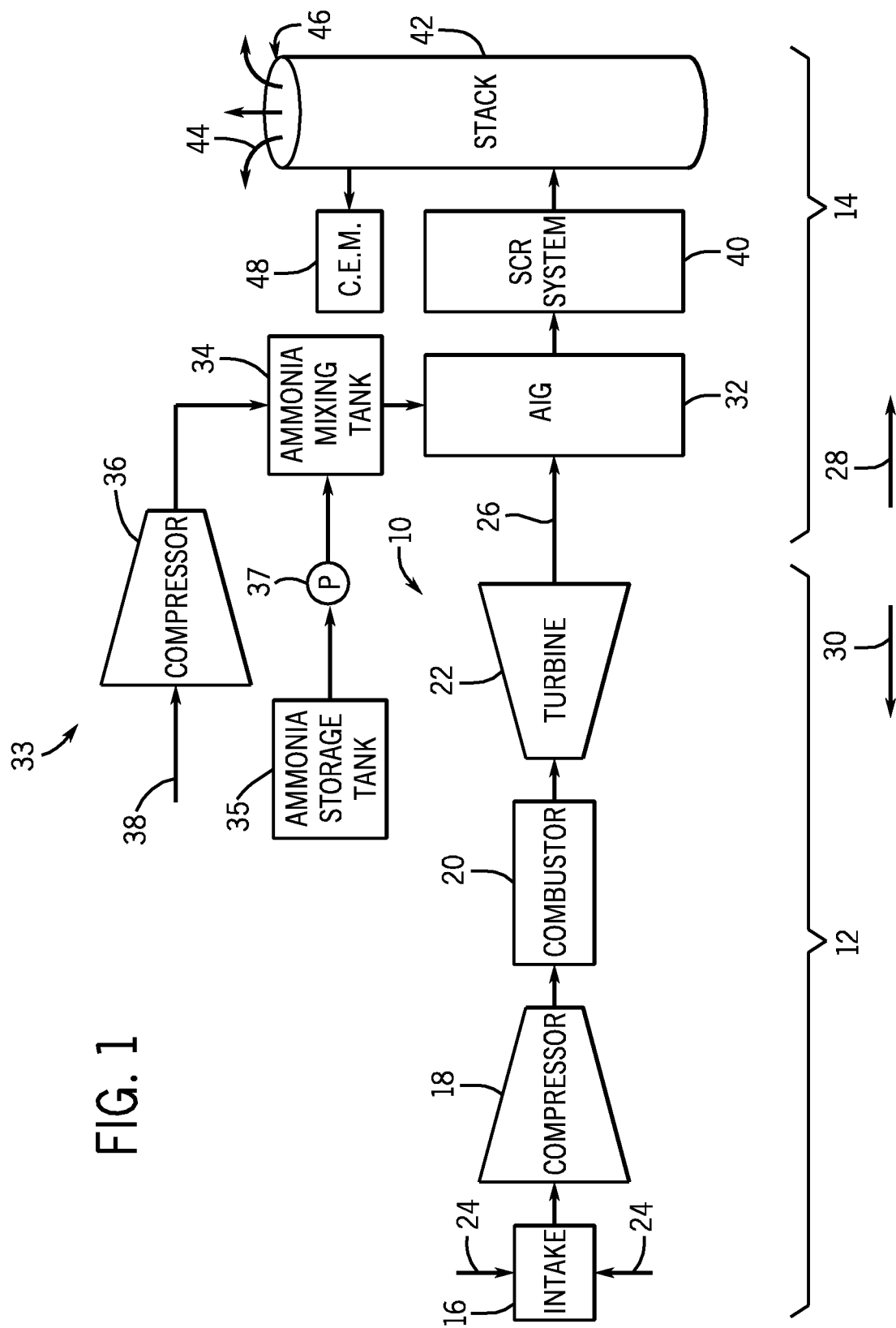
FIG. 1 is a block diagram of a turbine system that includes an ammonia injection system driven by air heated and pressured in a compressor in accordance with certain embodiments of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain combustion-based systems, such as gas turbine systems, an ammonia injection system is employed to inject ammonia vapor into the exhaust gas, thereby decreasing emissions of NOx. Unfortunately, operating such an ammonia injection system is expensive due to the power utilized to deliver the ammonia to the exhaust gas. For example, certain ammonia injection systems include a blower and heat exchanger configured to pressurize and heat air. The air is then routed to an ammonia mixing tank which contains ammonia provided by an ammonia storage tank. The hot pressurized air vaporizes the ammonia and injects it into the exhaust gas. The temperature and pressure of the air flow may be particularly configured to establish an ammonia flow rate sufficient to reduce emissions to regulatory levels. The energy utilized to operate the blower and heat exchanger to provide such an ammonia flow rate significantly increases the costs associated with operating a gas turbine system.

Embodiments of the present disclosure may significantly reduce operating costs of ammonia injection systems by employing a compressor to both heat and pressurize air that conveys ammonia to the exhaust gas. As appreciated, the compressor (i.e., a single unit) replaces both the blower and the heat exchanger (i.e., two independent units) to reduce space consumption and complexity in the facility, while also increasing performance by providing pressurized air. Specifically, an ammonia injection system may include an ammonia injection grid configured to inject ammonia into exhaust gas from a combustion process (e.g., operation of a gas turbine engine). The ammonia injection system may also include an ammonia mixing tank in fluid communication with the ammonia injection grid. Such a configuration may include a compressor in fluid communication with the ammonia mixing tank and configured to output an air flow having a temperature configured to vaporize the ammonia within the ammonia mixing tank and a pressure configured to inject the vaporized ammonia into the exhaust gas via the ammonia injection grid. Because the compressor both heats and pressurizes the air, utilization of a separate heat exchanger may be obviated. Such a configuration may reduce maintenance costs due to the reduction in components, and substantially reduce or eliminate the thermal delay associated with raising the heat exchanger to an operating temperature. Furthermore, the compressor may provide a higher air pressure than configurations employing a blower. The higher pressure air may facilitate effective mixing of ammonia and exhaust gas with a lower flow rate than air provided by a blower. Because of the lower air flow rate, less energy may be utilized to heat and pressurize the air, thereby reducing operational costs.

Turning now to the drawings, FIG. 1 is a block diagram of an exemplary turbine system 10 that includes a gas turbine engine 12 and an exhaust processing system 14. In certain embodiments, the turbine system 10 may be a power generation system. The turbine system 10 may use liquid or gas fuel, such as natural gas and/or a hydrogen-rich synthetic gas, to run the turbine system 10. In further embodiments, the exhaust processing system 14 may be coupled to another engine configuration (e.g., reciprocating diesel engine) or other combustion device that emits exhaust gas (e.g., burner).

In the present embodiment, the gas turbine engine 12 includes an air intake section 16, a compressor 18, a combustor section 20, and a turbine 22. The turbine 22 may be drivingly coupled to the compressor 18 via a shaft. In operation, air enters the turbine engine 12 through the air intake section 16 (indicated by arrows 24) and is pressurized in the compressor 18. The compressor 18 may include multiple compressor blades coupled to the shaft. The rotation of the shaft causes rotation of the compressor blades, thereby drawing air into the compressor 18 and compressing the air prior to entry into the combustor section 20.

The combustor section 20 may include one or more combustors. In one embodiment, multiple combustors may be circumferentially positioned in a generally circular or annular configuration about the shaft. As compressed air exits the compressor 18 and enters the combustor section 20, the compressed air may be mixed with fuel for combustion within the combustor(s). For example, the combustor(s) may include one or more fuel nozzles that may inject a fuel-air mixture into the combustor(s) in a suitable ratio for optimal combustion, emissions, fuel consumption, power output, and so forth. The combustion of the air and fuel may generate hot pressurized exhaust gases, which may then be utilized to drive one or more turbine blades within the turbine 22. In operation, the combustion gases flowing into and through the turbine 22 flow against and between the turbine blades, thereby driving the turbine blades and, thus, the shaft into rotation to drive a load, such as an electrical generator in a power plant. As discussed above, the rotation of the shaft also causes blades within the compressor 18 to draw in and pressurize the air received by the intake 16.

The combustion gases that flow through the turbine 22 may exit the turbine 22 as a stream of exhaust gas 26 flowing in a generally downstream direction 28. Because the turbine engine 12 is positioned generally upstream (i.e., along an upstream direction 30) from the exhaust processing system 14, exhaust gas 26 expelled by the turbine engine 12 in the downstream direction 28 flows into the exhaust processing system 14. For instance, the turbine 22 may be fluidly coupled to the exhaust processing system 14 and, particularly, to a catalyst injection grid, such as an ammonia injection grid (AIG) 32 of an ammonia injection system 33 or other emissions reduction system. As discussed above, as a result of the combustion process, the exhaust gas 26 may include certain byproducts, such as nitrogen oxides ($NO_x$), sulfur oxides ($SO_x$), carbon oxides ($CO_x$), and unburned hydrocarbons. Due to certain regulatory requirements, the exhaust processing system 14 may be employed to substantially reduce the concentration of such byproducts prior to releasing the exhaust gas stream into the atmosphere.

One technique for removing or reducing the amount of $NO_x$ in an exhaust gas stream is by using a Selective Catalytic Reduction (SCR) process. For example, in an SCR process for removing $NO_x$ from the exhaust gas stream 26, ammonia ($NH_3$) is injected into the exhaust gas stream via the ammonia injection system 33 and reacts with the $NO_x$ to produce nitrogen ($N_2$) and water ($H_2O$). The ammonia injection grid 32 may be configured to inject ammonia ($NH_3$) into the exhaust gas stream 26. In one embodiment, the ammonia injection grid 32 may include a network of pipes with orifices for injecting ammonia into the exhaust gas stream 26.

As discussed in detail below, the ammonia injection system 33 includes the AIG 32, an ammonia or other catalyst mixing tank 34, an ammonia or other catalyst storage tank 35, a pump 37, and a compressor 36. Ammonia from the ammonia storage tank 35 is transferred to the ammonia mixing tank 34 by the ammonia pump 37. Furthermore, air, as illustrated by the arrow 38, enters the compressor 36 where it is compressed. As will be appreciated, the process of compressing air both increases its temperature and pressure. The air output from the compressor 36 flows into the ammonia mixing tank 34 which contains ammonia in an aqueous form. The flow of hot pressurized air from the compressor 36 causes the ammonia to vaporize or evaporate, dilutes the vaporized ammonia, and conveys the ammonia vapor to the AIG 32. In the present embodiment, the compressor 36 is configured to output an air flow having a temperature sufficient to vaporize a desired quantity of ammonia without an external heat source. For example, the temperature of air output from the compressor 36 may be approximately between 300 to 600, 350 to 550, 400 to 500, or about 450 degrees Fahrenheit. By further example, the temperature of the output air flow may be greater than approximately 300, 350, 400, 450, 500, 550, or 600 degrees Fahrenheit. Interaction between the high temperature air and the ammonia causes the ammonia to evaporate and mix with the air flow, thereby establishing a dilute mixture of ammonia vapor and air. As will be appreciated, due to the latent heat of vaporization of the aqueous ammonia, the temperature of the ammonia/air mixture will decrease as the ammonia evaporates. For example, the ammonia/air mixture exiting the ammonia mixing tank 34 may be approximately between 200 to 300, 225 to 275, or about 250 degrees Fahrenheit. Such an ammonia temperature range may enhance the reaction between the ammonia and the exhaust gas. In contrast, a blower may only discharge air at approximately between 150 to 250, 175 to 225, or about 200 degrees Fahrenheit. Therefore, a separate heat exchanger may be employed to increase the air temperature to a level sufficient to vaporize the ammonia and provide the ammonia/air mixture to the AIG 32 at the desired temperature range. In the present embodiment, because the compressor alone is capable of establishing the desired ammonia/air mixture temperature, the heat exchanger found in configurations employing a blower may be obviated. Consequently, turbine system maintenance costs may be decreased due to the reduction in components, and the thermal delay associated with raising the heat exchanger to the desired temperature may be substantially reduced or eliminated. In addition, the compressor 36 (i.e., a single component) may utilize less space than the blower and heat exchanger (i.e., two components).

In addition, the pressure of the air flow from the compressor 36 may be higher than the pressure output from configurations employing a blower. For example, a blower may provide air at an absolute pressure of approximately between 15 to 25, 16 to 22, 17 to 19, or about 17 psi. In contrast, the compressor 36 is configured to provide an output absolute air pressure of approximately between 30 to 80, 35 to 70, 40 to 60, or about 45 psi. By further example, output absolute air pressure may be greater than approximately 30, 40, 50, 60, 70, or 80 psi. Therefore, the compressor 36 provides an output pressure at least approximately 1.5, 2, 2.5, 3, 3.5, 4, or more times greater than a blower. As discussed in detail below, the additional pressure may establish a well-mixed flow of exhaust gas and ammonia within the AIG 32, while flowing less air than embodiments employing a blower. For example, to establish a well-mixed flow of exhaust gas and ammonia within the AIG 32, a blower may provide an air mass flow rate of approximately between 30,000 to 50,000, 35,000 to 45,000, 35,000 to 40,000, or about 38,000 pounds per hour. In contrast, the compressor 36 may achieve a well-mixed flow while only providing an air mass flow rate of approximately between 15,000 to 25,000, 17,000 to 23,000, 19,000 to 21,000, or about 20,000 pounds per hour. Therefore, the compressor 36 may flow at least approximately 1.5, 2, 2.5, 3, 3.5, 4, or more times less air than a blower.

The compressor 36 may establish a well-mixed flow of ammonia and exhaust gas within the AIG 32 using a lower flow rate because of the increased pressure provided by the compressor 36. As will be appreciated, providing a higher pressure ammonia/air mixture to the exhaust gas increases mixing efficiency compared to the lower pressures associated with air provided by a blower. Specifically, for a given AIG orifice size, a higher pressure flow will exit the orifice at a greater velocity, thereby increasing the difference in velocity between the exhaust gas and the ammonia/air mixture. The difference in velocity may establish a turbulent flow that enhances mass diffusion between the ammonia and exhaust gas. Because the compressor 36 provides a reduced air mass flow rate, less energy may be utilized to compress and heat the air (i.e., drive the compressor 36), thereby reducing operational costs of the ammonia injection system 33.

In addition, the higher pressure may provide enhanced mixing of the ammonia and the exhaust gas, thereby decreasing the quantity of ammonia sufficient to reduce emissions to regulatory levels. For example, in certain configurations and assuming complete mixing, approximately 300 pounds per hour of ammonia may be injected into the exhaust gas to comply with regulations regarding output of NOx. However, embodiments employing a blower may not achieve complete mixing due to inefficient mass diffusion between the ammonia and the NOx. Therefore, additional ammonia may be injected into the exhaust gas to compensate. For example, an additional 5%, 10%, 15%, 20%, 25%, or more ammonia over the desired 300 pounds per hour may be mixed with the exhaust gas. In contrast, due to the enhanced mixing associated with the higher pressure from the compressor 36, the present embodiment may utilize less ammonia (i.e., closer to the desired quantity) to achieve an acceptable output of regulated exhaust gas. The reduction in ammonia consumption may both decrease costs and reduce emissions of unreacted ammonia.

Furthermore, the higher pressure air from the compressor 36 may obviate the use of tuning valves present in embodiments employing a low pressure blower. Specifically, due to the low pressure air provided by the blower, the ammonia/air mixture may not be evenly distributed to each orifice of the AIG 32. Therefore, embodiments employing a blower may utilize tuning valves to restrict flow to certain areas of the AIG 32 and increase flow to other areas. In such embodiments, an operator may periodically adjust the flow through each of these tuning valves to maintain an even distribution of the ammonia/air mixture throughout the AIG 32. In the present embodiment, the higher pressure air flow from the compressor 36 may serve to evenly distribute the ammonia/air mixture to each of the AIG orifices without the use of tuning valves, thereby decreasing manufacturing and operational costs.

Further downstream, an SCR system 40 may be implemented using any suitable geometry, such as a honeycomb or plate configuration. Within the SCR system 40, the ammonia essentially acts as a catalyst and reacts with the $NO_x$ in the exhaust gas stream 26 to produce nitrogen ($N_2$) and water ($H_2O$), thus removing $NO_x$ from the exhaust gas 26 prior to release into the atmosphere through a stack 42, as indicated by the flow arrows 44. The stack 42, in some embodiments, may include a silencer or muffler. By way of example and depending on current regulatory standards, the exhaust processing system 14 may utilize the SCR system 40 to reduce the composition of $NO_x$ in the processed exhaust gas stream, referred to by reference number 46, to approximately 3 ppm or less.

While the present embodiment is generally focused on the processing and removal of $NO_x$ from the exhaust gas stream 26, other embodiments may provide for the removal of other combustion byproducts, such as carbon monoxide or unburned hydrocarbons. As such, the supplied catalyst may vary depending on the composition that is being removed from the exhaust gas stream 26. Additionally, it should be understood that the embodiments disclosed herein are not limited to the use of one SCR system 40, but may also include multiple SCR systems 40. Still further, the system 10 may also include a continuous emissions monitoring (CEM) system 48 that continuously monitors the composition of the processed exhaust stream 46 exiting the stack 42. If the CEM system 48 detects that the composition of the processed exhaust stream 46 fails to comply with one or more regulatory requirements, the CEM system 48 may provide notification to an appropriate regulatory entity (e.g., Environmental Protection Agency), which may be tasked with instigating further action, such as notifying the operators of the system 10 to adjust operating parameters, perform service, or otherwise cease operating the system 10 until it can be determined that the processed exhaust stream 46 produced by the system 10 conforms with the regulatory requirements. In some embodiments, the CEM system 48 may also implement corrective actions, such as adjusting compressor capacity (i.e., degree of air compression), temperature, flow rates, etc.

Figure 2:
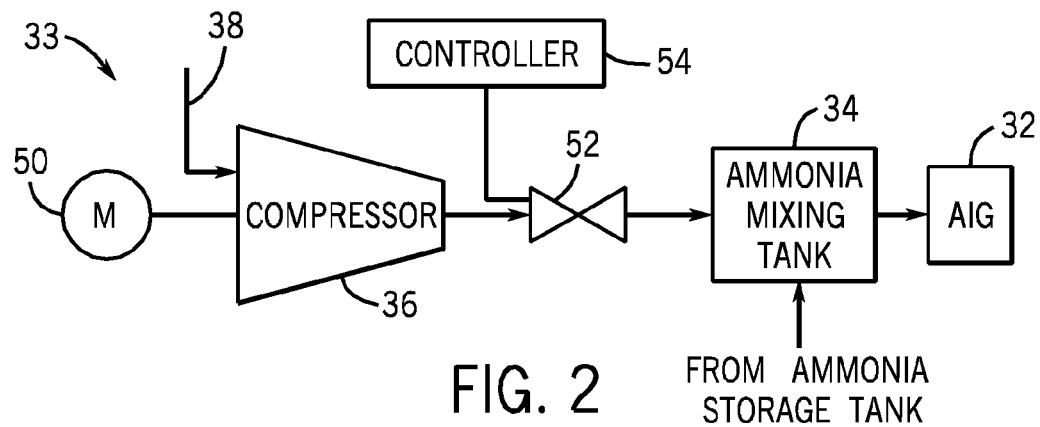
FIG. 2 is a block diagram of the ammonia injection system, as shown in FIG. 1, employing a flow control valve to regulate compressor output in accordance with certain embodiments of the present technique.

FIG. 2 is a block diagram of the ammonia injection system 33, as shown in FIG. 1, employing a flow control valve to regulate compressor output. As previously discussed, the compressor 36 provides an air flow to the ammonia mixing tank 34 having a temperature sufficient to vaporize the ammonia within the tank 34, and a pressure sufficient to flow the vaporized ammonia to the ammonia injection grid 32. The present embodiment may employ any suitable compressor configuration. For example, certain embodiments may include a centrifugal compressor, a reciprocating compressor, a rotary screw compressor, an axial flow compressor, a scroll compressor, or other compressor configuration. In the present embodiment, the compressor 36 is driven to rotate by an electric motor 50. Alternative embodiments may employ other drive units, such as a pneumatic motor, a hydraulic motor, or a combustion engine.

In the present embodiment, the compressor 36 is driven to rotate at a substantially constant speed. The particular speed may be selected such that the compressor 36 produces an air flow at a desired temperature for ammonia vaporization. However, compressing the air to achieve a desired temperature may result in a larger than desired pressure. Therefore, the illustrated embodiment includes a flow control valve 52 disposed between the compressor 36 and the ammonia mixing tank 34. The flow control valve 52 is configured to restrict the air flow into the ammonia mixing tank 34 to sufficiently vaporize the ammonia delivered from the ammonia storage tank 35, such that a proper quantity of ammonia is conveyed to the AIG 32. The proper quantity of ammonia depends on the amount of emissions detected or plant load. For example, during periods of higher turbine emissions (e.g., higher loads, higher sensed emissions, higher temperatures, etc.), the flow control valve 52 may facilitate a larger flow rate as more ammonia is supplied to the AIG 32. Conversely, during periods of lower turbine emissions (e.g., lower loads, lower sensed emissions, lower temperatures, etc.), the flow control valve 52 may restrict flow to sufficiently vaporize and properly heat the ammonia provided to the AIG 32.

As illustrated, the flow control valve 52 is communicatively coupled to a controller 54 configured to adjust the flow rate through the valve 52 based on the desired ammonia flow rate. Because the compressor 36 is configured to provide higher pressure air than configurations employing a blower, enhanced mixing between the ammonia and the exhaust gas may be achieved in the AIG 32. The enhanced mixing may reduce the quantity (i.e., mass flow rate) of ammonia and/or air injected into the AIG 32 to reduce emissions to regulatory levels. The reduction in ammonia may decrease operational costs and reduce emissions of unreacted ammonia. Similarly, the reduced air flow may consume less energy to heat and pressurize compared to the higher air flow utilized in embodiments employing a blower and heat exchanger, thereby further reducing operational costs.

Figure 3:
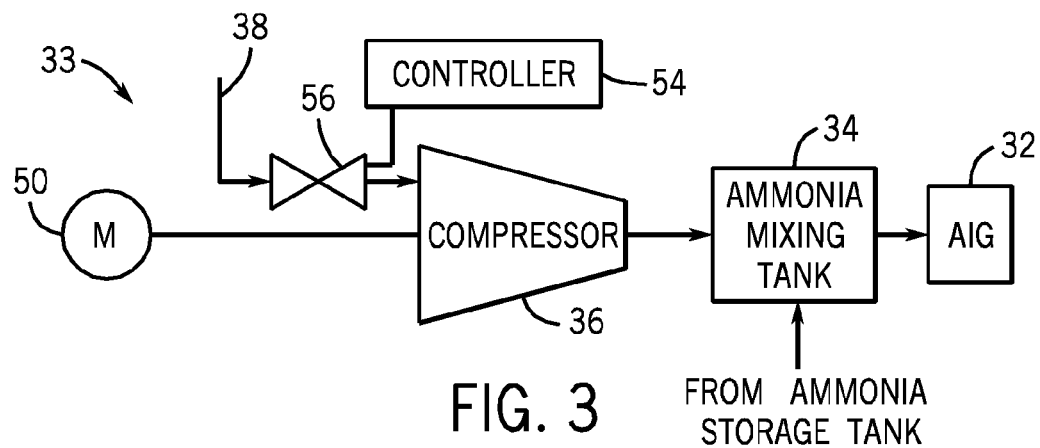
FIG. 3 is a block diagram of a first alternative embodiment of the ammonia injection system of FIG. 2, employing an inlet pressure control valve to regulate compressor output.

FIG. 3 is a block diagram of a first alternative embodiment of the ammonia injection system 33, employing an inlet pressure control valve 56 to regulate compressor output. In the present configuration, the inlet pressure control valve 56 is disposed upstream of the compressor 36. In this position, external air flow 38 passes through the valve 56 prior to entering the compressor 36. By adjusting the flow through the inlet pressure control valve 56, the compressor 36 may expel an air flow to the ammonia mixing tank 34 at a desired pressure. Similar to the previously described embodiment, a controller 54 is communicatively coupled to the valve 56. The controller 54 is configured to instruct the valve 56 to facilitate a higher flow rate into the compressor 36 during periods where a higher pressure from the compressor 36 is desired, and restrict flow into the compressor 36 during periods where a lower pressure is desired. As previously discussed, higher pressure may be utilized during periods of higher turbine emissions, and lower pressure may be utilized during periods of lower turbine emissions. By adjusting the flow of air into the compressor 36, a desired flow rate of heated air for providing ammonia into the AIG 32 may be achieved.

Figure 4:
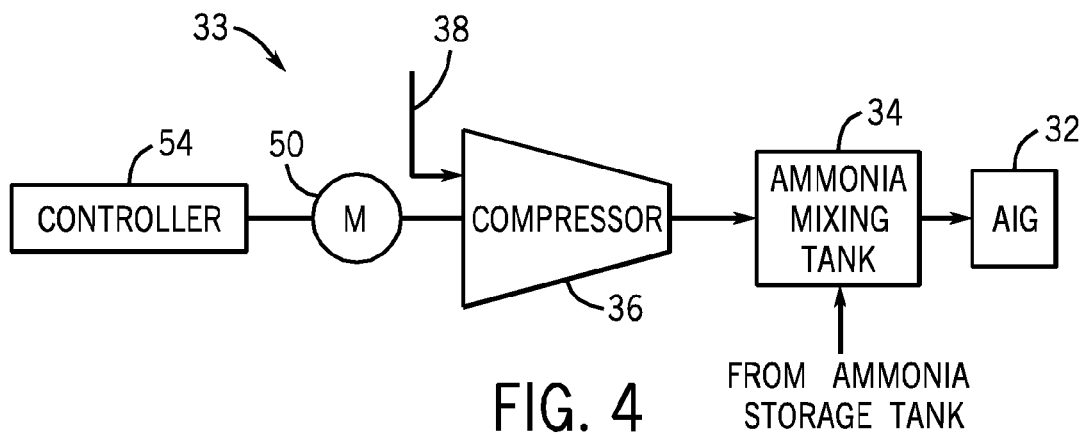
FIG. 4 is a block diagram of a second alternative embodiment of the ammonia injection system of FIG. 2, employing a motor controller to regulate compressor output.

FIG. 4 is a block diagram of a second alternative embodiment of the ammonia injection system 33, employing a motor controller 54 to regulate compressor output. In the illustrated embodiment, pressure from the compressor 36 is regulated by adjusting the rotational speed of the compressor 36. As previously discussed, the compressor 36 is coupled to a drive unit, such as the illustrated electric motor 50. By varying the speed of the electric motor 50, the controller 54 may control the capacity (i.e., degree of air compression) of the compressor 36. For example, in certain configurations the controller 54 may be a variable frequency drive (VFD) and the motor 50 may be an induction motor. In such configurations, the VFD facilitates continuously variable adjustment of the motor speed. For example, if the motor 50 is an 8-pole three-phase A/C induction motor and the frequency of the supplied electricity is 60 Hz, the motor 50 may rotate at 900 RPM (i.e., synchronous speed of the motor 50). The VFD may vary the frequency of the electricity supplied to the motor 50 such that the motor 50 may be operated at different speeds. Varying the speed of the motor 50 alters the rotational speed of the compressor 36, thereby adjusting the pressure and temperature of the air flow into the ammonia mixing tank 34.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
    an ammonia injection system, comprising:
        an ammonia injection grid (AIG) configured to inject ammonia into exhaust gas from a combustion process;
        an ammonia mixing tank in fluid communication with the AIG;
        a compressor in fluid communication with the ammonia mixing tank, wherein the compressor outputs an air flow having a temperature sufficient to vaporize aqueous ammonia within the ammonia mixing tank and a pressure sufficient to inject the vaporized ammonia into the exhaust gas via the AIG while the ammonia injection system is in operation; and
        an electronic controller configured to control the temperature, the pressure, or a combination thereof, of the air flow to effectively vaporize the aqueous ammonia within the ammonia mixing tank, and to provide a desired quantity of the vaporized ammonia to the exhaust gas.

2. The system of claim 1, wherein the temperature of the air flow output from the compressor is at least approximately 300 degrees Fahrenheit.

3. The system of claim 1, wherein the pressure of the air flow output from the compressor is at least approximately 30 psi.

4. The system of claim 1, comprising a flow control valve disposed between the compressor and the ammonia mixing tank, wherein the electronic controller is configured to control the pressure of the air flow by adjusting the flow control valve.

5. The system of claim 1, comprising an inlet pressure control valve disposed upstream of the compressor, wherein the electronic controller is configured to control the pressure of the air flow by adjusting the inlet pressure control valve.

6. The system of claim 1, wherein the electronic controller is configured to control the temperature, the pressure, or the combination thereof, of the air flow by varying a speed of the compressor.

7. The system of claim 1, comprising a selective catalytic reduction system disposed downstream from the ammonia injection system.

8. The system of claim 1, comprising a turbine engine configured to output the exhaust gas into the AIG.

9. A system comprising:
- an ammonia injection grid (AIG) air compressor that provides an air flow to an ammonia mixing tank while the system is in operation, wherein a temperature of the air flow is sufficient to vaporize aqueous ammonia within the ammonia mixing tank, and a pressure of the air flow is sufficient to inject the vaporized ammonia into exhaust gas of a combustion reaction; and
- an electronic controller configured to control the temperature, the pressure, or a combination thereof, of the air flow to effectively vaporize the aqueous ammonia within the ammonia mixing tank, and to provide a desired quantity of the vaporized ammonia to the exhaust gas.

10. The system of claim 9, wherein the temperature of the air flow is approximately between 300 to 600 degrees Fahrenheit.

11. The system of claim 9, wherein the pressure of the air flow is approximately between 30 to 80 psi.

12. The system of claim 9, wherein the AIG air compressor comprises a centrifugal compressor, a reciprocating compressor, a rotary screw compressor, an axial flow compressor, or a scroll compressor.

13. The system of claim 9, comprising a flow control valve disposed downstream from the AIG air compressor, wherein the electronic controller is configured to control the pressure of the air flow by adjusting the flow control valve.

14. The system of claim 9, comprising an inlet pressure control valve disposed upstream of the AIG air compressor, wherein the electronic controller is configured to control the pressure of the air flow by adjusting the inlet pressure control valve.

15. The system of claim 9, comprising a motor configured to drive the AIG air compressor, wherein the electronic controller is communicatively coupled to the motor and configured to control the temperature, the pressure, or the combination thereof, of the air flow by varying a speed of the motor.

16. A system comprising:
an emissions reduction system, comprising:
- a compressor in fluid communication with a catalyst mixing tank, wherein the compressor outputs an air flow that delivers catalyst from the catalyst mixing tank to a catalyst injection grid while the emissions reduction system is in operation, wherein a temperature of the air flow is increased only by the compressor, the temperature of the airflow is sufficient to vaporize aqueous catalyst within the catalyst mixing tank, and a pressure of the airflow is sufficient to inject the vaporized catalyst into exhaust gas via the catalyst injection grid; and
- an electronic controller configured to control the temperature, the pressure, or a combination thereof, of the air flow to effectively vaporize the aqueous catalyst within the catalyst mixing tank, and to provide a desired quantity of the vaporized catalyst to the exhaust gas.

17. The system of claim 16, wherein the compressor is configured to output the air flow at the pressure of at least approximately 30 psi, the compressor is configured to increase the temperature of the air flow to at least approximately 300 degrees Fahrenheit, or a combination thereof.

18. The system of claim 16, wherein the emissions reduction system comprises a flow control valve disposed downstream from the compressor, wherein the electronic controller is configured to control the pressure of the air flow by adjusting the flow control valve.

19. The system of claim 16, wherein the emissions reduction system comprises an inlet pressure control valve disposed upstream of the compressor, wherein the electronic controller is configured to control the pressure of the air flow by adjusting the inlet pressure control valve.

20. The system of claim 16, wherein the emissions reduction system comprises a motor configured to drive the compressor, wherein the electronic controller is communicatively coupled to the motor and configured to control the temperature, the pressure, or the combination thereof, of the air flow by varying a speed of the motor.

* * * * *